United States Patent
Okasato

Patent Number: 5,904,293
Date of Patent: May 18, 1999

[54] AIR MIX CONTROLLER OF AUTOMOBILE AIR CONDITIONER

[75] Inventor: Yoshitaka Okasato, Tokyo, Japan

[73] Assignee: Calsonic Corporation, Tokyo, Japan

[21] Appl. No.: 08/899,758

[22] Filed: Jul. 24, 1997

[30] Foreign Application Priority Data

Jul. 24, 1996 [JP] Japan ........................... 8-194933

[51] Int. Cl.⁶ ............................................. B60H 1/00
[52] U.S. Cl. .......................................... 236/49.3; 236/13
[58] Field of Search ................ 236/49.3, 13, 91 R, 236/91 C, 91 E, 91 F, 51; 165/202, 203, 204; 62/244, 239

[56] References Cited

U.S. PATENT DOCUMENTS

| | | | |
|---|---|---|---|
| 4,899,930 | 2/1990 | Kagohata et al. | 236/91 F |
| 4,930,698 | 6/1990 | Takekawa et al. | 236/49.3 |
| 4,994,958 | 2/1991 | Iida | 236/13 X |

FOREIGN PATENT DOCUMENTS

| | | |
|---|---|---|
| 58-24577 | 5/1983 | Japan . |
| 59-39333 | 9/1984 | Japan . |

*Primary Examiner*—Harry B. Tanner
*Attorney, Agent, or Firm*—Foley & Lardner

[57] ABSTRACT

Control parameter (target opening) Xm is stored in a memory and the Xm value stored in the memory is used instead of a PBR value to calculate a deviation S value by a conventional control system. Change amount ΔXm of a first-order lag is found in response to the S value and the Xm value is corrected. The corrected Xm value is stored in the memory to update the memory contents and is transmitted to an air mix door actuator as a command value.

5 Claims, 3 Drawing Sheets

AIR MIX CONTROLLER OF AUTOMOBILE AIR CONDITIONER

BACKGROUND OF THE INVENTION

1. Field of the Invention

This invention relates to an air mix controller appropriate for an automobile air conditioner using a plurality of actuators of the same kind.

2. Description of the Related Art

A control system wherein door driving actuators are unified all to PBR actuators containing ICs for comprehensively controlling the actuators by an auto amplifier using serial communication over one communication line, which will be hereinafter referred to as "air conditioning LAN system, for decreasing the number of harnesses and reducing system costs is developed at present as an actuator control system used for an automobile air conditioner.

By the way, a method as shown in a flowchart in FIG. 3 is available as a conventional air mix control method in general automobile air conditioners other than the air conditioning LAN system. Here, only a brief description is given because a detailed description will be given later. Generally, the main body of an automobile air conditioner is made up of an intake unit for selectively introducing inside or outside air of an automobile, a cooling unit containing an evaporator forming a cooler cycle, and a heater unit containing a heater core circulating engine cooling water for controlling the heat air amount with an air mix door so as to adjust a temperature.

To control an actuator for driving the air mix door (air mix door actuator), an auto amplifier first inputs various data values, such as setup temperature, cabin temperature, outside air temperature, solar radiation amount, and suction temperature (air temperature at the cooling unit exit, namely, temperature of air sucked into the heater unit making a temperature adjustment) at step S21 and calculates a target temperature in the cabin (target room temperature) according to a predetermined calculation expression at step S22, then inputs the door opening value detected by PBR (PBR value) at step S23 and calculates the current opening of the air mix door, X, using a predetermined calculation expression according to the PBR characteristic considering a link, etc., at step S24. Then, at step S25, the auto amplifier calculates deviation S value according to a predetermined calculation expression from the target room temperature found at step S22 and the door opening X found at step S24.

When the S value is found, the auto amplifier compares the S value with ±2° C. at step S26. As the result of the comparison, if the S value is less than −2° C., the auto amplifier drives the actuator to the cool side at step S27; if the S value lies in the range of −2° C. to +2° C., the auto amplifier holds the actuator at step S28; if the S value is greater than +2° C., the auto amplifier drives the actuator to the hot side at step S29. At the termination of steps S26 to S29, the auto amplifier returns to step S21 and repeats execution of step S21 and the following steps in a predetermined short control cycle.

However, such an air mix control method cannot be applied to the air conditioning LAN system. The reason why the method cannot be applied to the system is as follows: In the air conditioning LAN system, the auto amplifier simply transmits control data (target position) to actuators and the actuators perform specific positioning of doors on their own while monitoring the current positions according to the target position data, thus the detected PBR value is processed in the air mix door actuator and is not fed back into the auto amplifier.

Therefore, to construct the air conditioning LAN system, a new air mix control method (control program) for the system needs to be designed. At this time, if the minimum change is only required based on the conventional control program described above (see FIG. 3), it is extremely desirable because the conventional technique (control system) is followed, whereby the number of development steps is decreased and the control program reliability is also maintained.

SUMMARY OF THE INVENTION

It is therefore an object of the invention to provide an air mix controller of an automobile air conditioner appropriate for an air conditioning LAN system with the minimum change in a control program following the conventional air mix control system.

According to a first aspect of the invention, there is provided a door-opening controller for an automobile air conditioner comprising: a door to be opened at an arbitrary opening; an actuator for driving the door based on a given target position data; and control means for controlling the actuator so as to always set the door to an optimum opening; wherein the control means calculates a predetermined intermediate control parameter from a target temperature in a cabin provided by performing operations on various input signals and an initial target position data stored in an internal memory, corrects the initial target position data in sequence according to the intermediate control parameter value, stores the corrected target position data in the internal memory to update memory contents, and transmits the target position data to the actuator by two-way serial communication.

According to a second aspect of the invention, there is provided a method for setting a door of an automobile air conditioner to an optimum opening, comprising the steps of: performing operations on various input signals so as to obtain a target temperature in a cabin; setting an initial target position data; calculating a predetermined intermediate control parameter based on the target temperture and the initial target position data; correcting the initial target position data in sequence according to the intermediate control parameter value; storing the corrected target position data; and transmitting the target position data to an actuator for driving the door.

In the invention, the control means calculates a predetermined intermediate control parameter from the target temperature in the cabin provided by performing operations on various input signals and the target position data stored in the internal memory, corrects the target position data in sequence according to the found intermediate control parameter value, stores the corrected target position data in the memory as a control parameter to update the memory contents, and transmits the target position data to the actuator (air mix door actuator) by two-way serial communication. Upon reception of the corrected target position data, the air mix door actuator determines the rotation direction of the motor (forward rotation, reverse rotation, or stop) by the control circuit in response to the received target position data and output of the position detection means (current position of the air mix door), and actually controls the motor according to the determination result. At this time, if the intermediate control parameter is made the same as the control parameter in the conventional air mix control system (for example, deviation S value), it can be calculated by the same method as the conventional method and the program change may be minimized. The command value given to the actuator (target position) is calculated based on the conventional control parameter after all.

DETAILED DESCRIPTION OF THE PREFERRED EMBODIMENTS

Referring now to the accompanying drawings, there is shown a preferred embodiment of the invention.

Figure 1:
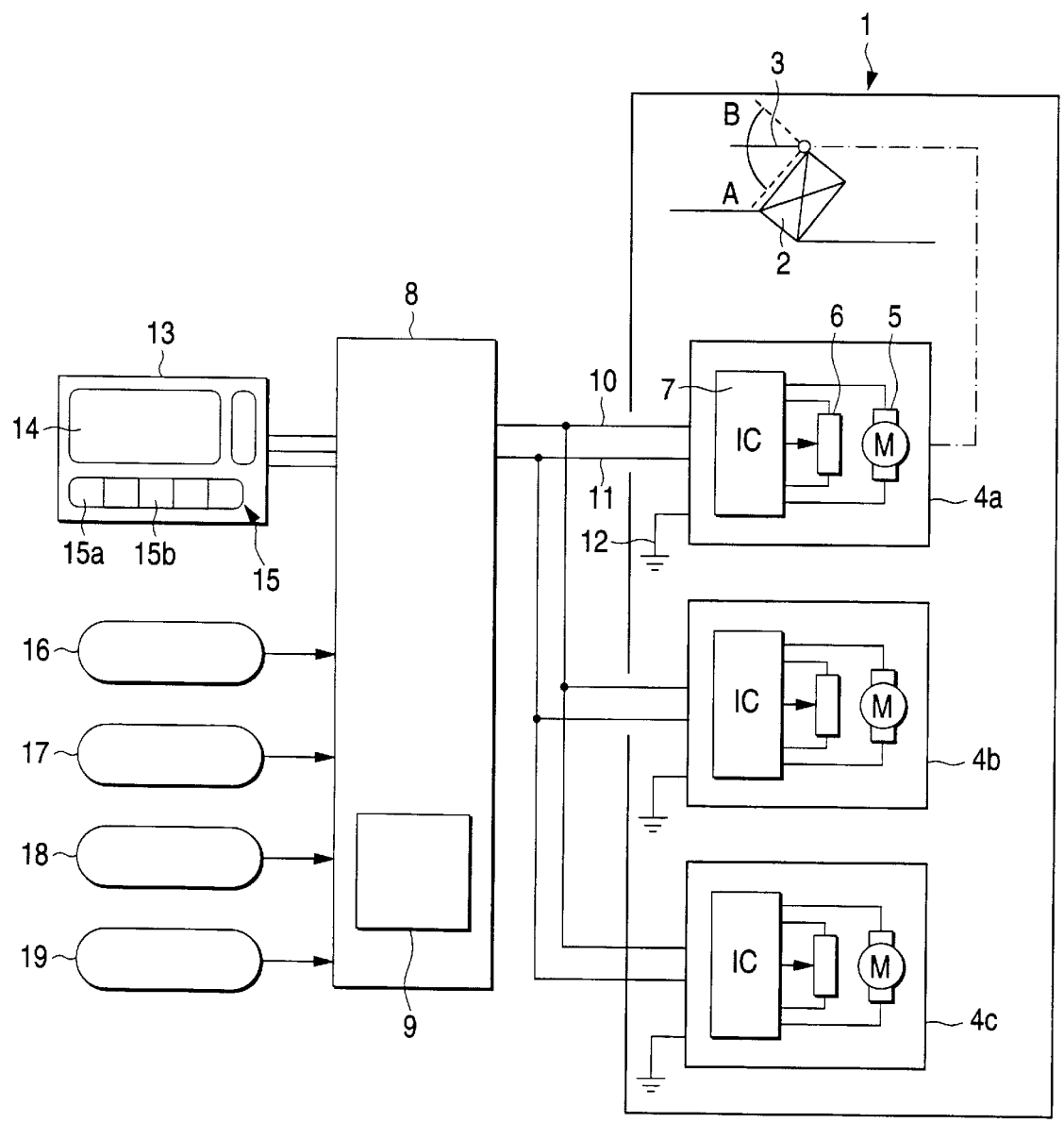
FIG. 1 is a schematic block diagram to show one embodiment of an air mix controller of an automobile air conditioner according to the invention.

FIG. 1 is a schematic block diagram to show one embodiment of an air mix controller of an automobile air conditioner according to the invention.

In the figure, a heater unit 1 forming the main body of an automobile air conditioner contains a heater core 2 using warm water (for example, engine cooling water) to heat air. An air mix door 3 for adjusting blow-out air temperature is attached pivotably upstream from the heater core 2. The air mix door 3 adjusts the ratio between air passing through the heater core 2 and air bypassing the heater core 2. This means that the air mix door 3 adjusts the ratio between the amount of warm air provided by allowing cool air cooled by an evaporator (not shown) disposed upstream from the heater core 2 to pass through the heater core 2 for heating the air and the amount of cool air passing through the evaporator and bypassing the heater core 2. The temperature of air blown out into the cabin (blow-out air temperature) is determined by the mix ratio between the cool air and warm air determined by the opening of the air mix door 3. The air mix door 3 pivots freely between A position (full cool position) and B position (full hot position) shown in FIG. 1 as limit positions. When the air mix door 3 is at the A position (full cool position), the opening of the air mix door 3 is 0% and all cool water passing through the evaporator bypasses the heater core 2 and is blown out directly into the cabin, delivering the maximum cooling. When the air mix door 3 is at the B position (full hot position), the opening of the air mix door 3 is 100% and all cool water passing through the evaporator passes through the heater core 2 and is heated and blown out into the cabin as warm air, delivering the maximum heating.

The air mix door 3 is opened and closed via a link (not shown) by an air mix door actuator 4a. An intake door and mode doors, such as a defroster door, a vent door, and a foot door, (not shown) are also opened and closed via links (not shown) by an intake door actuator 4b and a mode door actuator 4c.

Here, the automobile air conditioner is constituted by an air conditioning LAN system.

That is, all the actuators 4a–4c are of the same type. This type of actuator 4 is a so-called PBR motor actuator containing a motor 5 for driving the corresponding door, a PBR (potentio balance resistor) 6 for detecting the current position of the door as a voltage, and a custom IC 7 dedicated to the system. Position detection means is made of the PBR 6 and a control circuit is made of the custom IC 7. The PBR 6, which is a variable resistor, moves in association with a shaft of the actuator 4, converts the motor rotation position corresponding to the door position (opening) into a voltage value, and outputs the voltage value. The motor 5 and the PBR 6 are connected to the custom IC 7. The custom IC 7, which contains a microcomputer, can communicate with an auto amplifier described later, determine the rotation direction of the motor 5, namely, forward rotation, reverse rotation, or stop of the motor based on given target position data and output of the PBR 6, and rotate the motor 5 forward or reversely or stop the motor 5 in accordance with the determination. That is, the custom IC 7 has the functions of communicating with the external system, generating a control signal of the motor 5, and outputting a drive signal of the motor 5. The custom IC 7 enables the actuator 4 to perform stop control (positioning control) of the motor 5 on its own. For example, the custom IC 7 is mounted on a circuit board (not shown) provided in the actuator 4.

The actuators 4a–4c are controlled comprehensively by an auto amplifier 8 containing a microcomputer. Control means is made of the auto amplifier 8. Of course, the auto amplifier 8 comprises an internal memory 9. The auto amplifier 8 and the actuators 4a–4c are connected by one power line 10 and one communication line 11. More particularly, one power line 10 and one communication line 11 for the actuators 4a–4c are connected to the auto amplifier 8 and branch to the actuators 4a–4c for connection. Each actuator 4 is provided with one ground line 12. Therefore, each of the actuators 4a–4c has one power line 10, one communication line 11, and one ground line 12, and the number of harnesses between the auto amplifier 8 and the actuators 4a–4c becomes nine in total and is reduced drastically as compared with conventional general systems.

Here, communication signals transferred between the auto amplifier 8 and the actuators 4a–4c are transmitted only over one communication line 11 (one-line system) for two-way communication. Since the communication signals are transferred over one communication line 11, the system uses serial communication for transmitting information in series. That is, in the system, the auto amplifier 8 is adapted to use serial communication to control the actuators 4a–4c.

The communication signals (serial signals) transferred between the auto amplifier 8 and the actuators 4a–4c are formed in a predetermined format. For example, the communication signals (serial signals) transferred through the communication line 11 comprise actuator identification information (address) (ADR), a motor actuation/stop signal (ENA), a target position signal (DATA), and error sensing information (PRTY) as information sent from the auto amplifier 8 to the actuators 4a–4c and target position arrival information (POS) as information sent from the actuators 4a–4c to the auto amplifier 8. The ADR (address) is a signal representing the address of the actuator to which the communication signal is to be transmitted. That is, in the system, common signals are transmitted to all the actuators 4a–4c from the auto amplifier 8 at the same time, thus the ADR signal indicates which actuator the communication signal is directed for. The DATA (data) is control signal corresponding to each actuator 4a–4c, namely, a signal representing the door target stop position as the calculation result of the auto amplifier 8. In air mix control, the target position (opening) command value of the air mix door 3 is transmitted as a control parameter from the auto amplifier 8 to the air mix door actuator 4a.

An operation and display section 13 comprising switches and a display is connected to the auto amplifier 8. It is provided with a display 14 as well as switches 15, such as an air conditioner switch 15a for turning on a compressor (not shown) and starting the air conditioner and a temperature adjustment switch 15b for adjusting the temperature in the cabin. The auto amplifier 8 and the operation and display section 13 are integrated into one controller, for example. A battery (not shown) is connected to the controller. Power is supplied to the actuators 4a–4c from the battery via the auto amplifier 8 and the power line 10. For example, an inside air sensor 16 for detecting an air temperature in the cabin (room temperature), an outside air sensor 17 for detecting an outside temperature, a solar radiation sensor 18 for detecting the solar radiation amount, a suction temperature sensor 19 for detecting an air temperature passing through the evaporator, and the like are connected to the auto amplifier 8. The auto amplifier 8 inputs signals of the sensors, the switches, etc., performs operations on the input signals, and transmits information for actuating the actuators 4a–4c, such as the door target stop position, over one communication line 11. Each of the actuators 4a–4c drives the motor 5 for pivoting the door and making the door close to the target stop position while monitoring output of the PBR 6 indicating the current position of the door by a voltage in response to the data (target position) transmitted from the auto amplifier 8.

Figure 3:
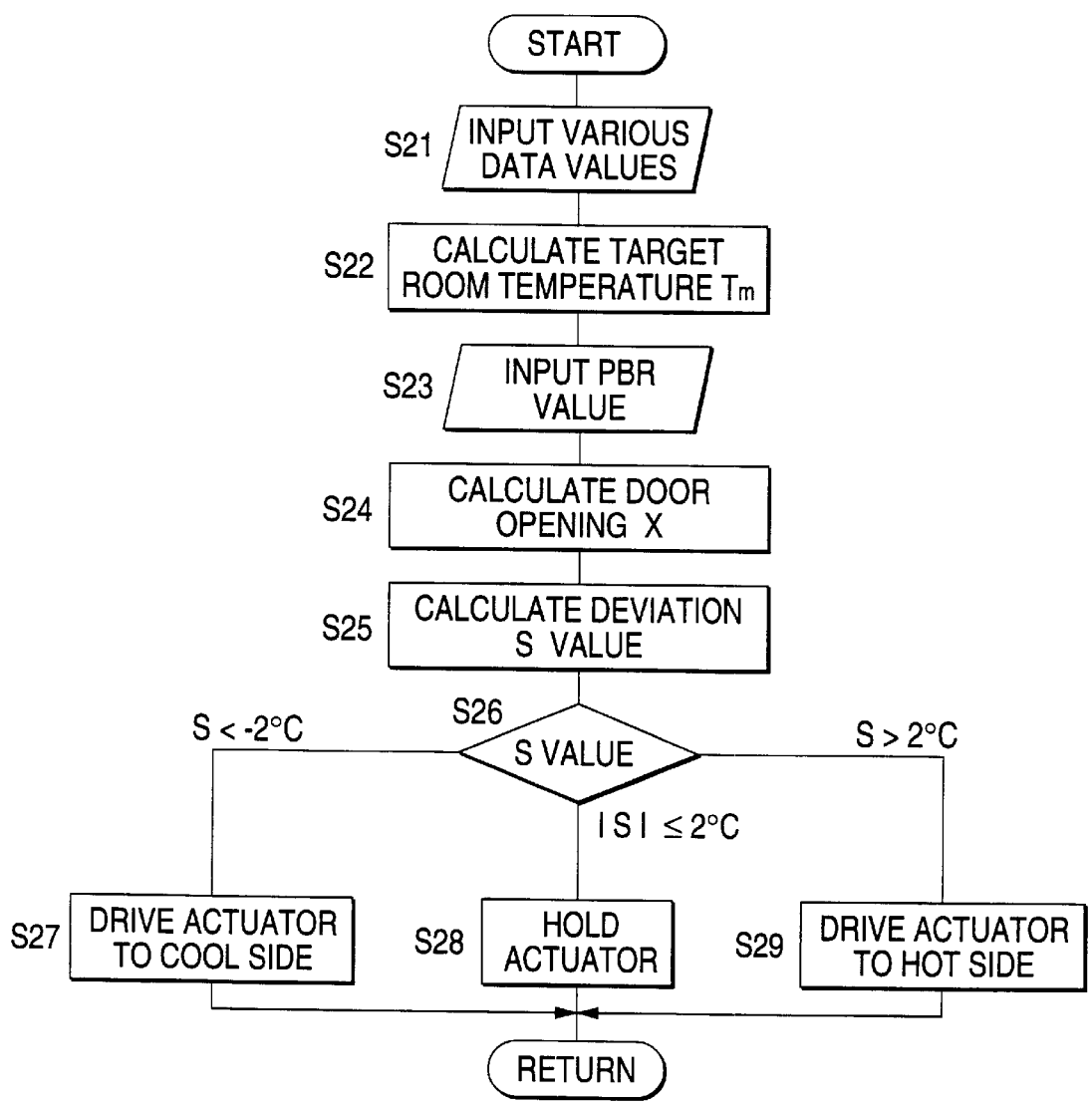
FIG. 3 is a flowchart to show a conventional air mix control system.

In such air mix control in the air conditioning LAN system, the PBR value indicating the opening of the air mix door 3 is not fed back into the auto amplifier 8 as described above, thus conventional control as shown in FIG. 3 cannot be performed. Then, in the embodiment, instead of the conventional control with the S value, the target position (opening) of the air mix door 3, Xm, is calculated as a control parameter (control variable) and this data is sent to the air mix door actuator 4a. At the time, to follow the conventional control system and minimize modification in the control program, the conventional S value is used as an intermediate control parameter and the control parameter (target position) Xm is corrected in response to the S value.

Figure 2:
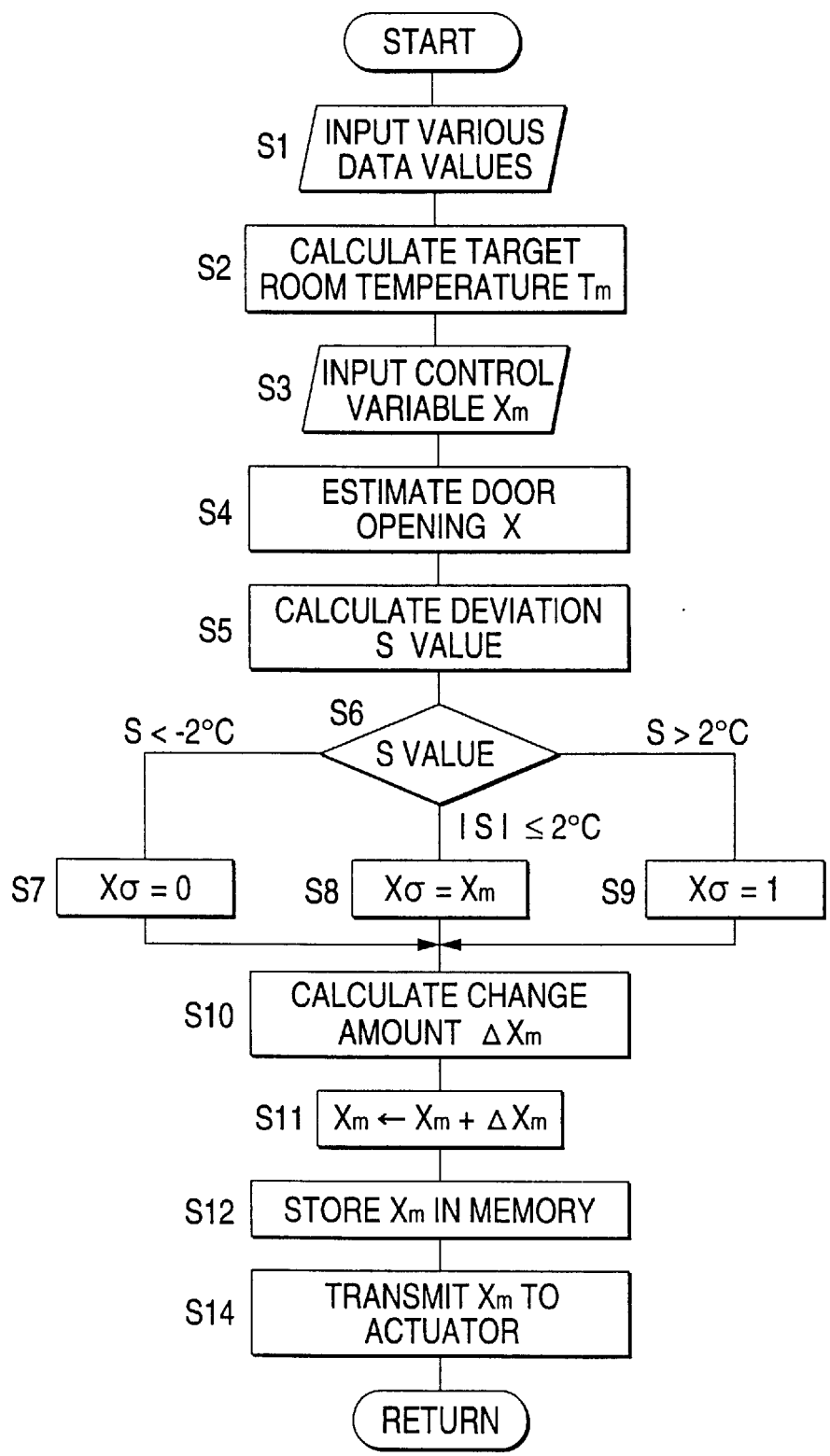
FIG. 2 is a flowchart to show the air mix control operation of an auto amplifier.

FIG. 2 is a flowchart to show the air mix control operation of the auto amplifier 8. Here, steps S1–S6 except step S3 are similar to the conventional process shown in FIG. 3 (steps S21–S26 except step S23); step S3 and step S7 and later steps are new steps.

When the modified control program is started, the auto amplifier 8 inputs various data values, such as a setup temperature from the temperature adjustment switch 15b, a cabin temperature from the inside air sensor 16, an outside temperature from the outside air sensor 17, the solar radiation amount from the solar radiation sensor 18, and a suction temperature from the suction temperature sensor 19, at step S1 and uses a preset vehicle thermal equilibrium constant to calculate a suction air target temperature in the cabin (target room temperature) Tm according to a predetermined calculation expression (for example, the same expression as used at step S22 in FIG. 3) at step S2.

Next, the auto amplifier 8 inputs the control parameter (door opening target value) Xm stored in the memory 9 at step S3 and estimates air mix door opening X using a predetermined calculation expression (for example, the same expression as used at step S24 in FIG. 3) at step S4. A proper predetermined value (for example, 0.5 (50%), etc.,) is entered in the memory 9 as an initial value of the control parameter Xm. The reason why the memory value is thus used to estimate (calculate) the door opening X is that the PBR value as in the conventional system is not input.

Next, the auto amplifier 8 uses the target room temperature Tm found at step S2 and the door opening X found at step S4 to calculate the deviation S value as an intermediate control parameter according to the following calculation expression at step S5:

$$S=Tm-(FX+G)(82-Tint)-Tint$$

where Tint is the suction temperature and F and G are constants. This expression is the same as that used at step S25 in FIG. 3.

When the S value is found, the auto amplifier 8 compares the S value with ±2° C. at step S6. As the result of the comparison, if the S value is less than –2° C., the auto amplifier 8 decreases the value of the control parameter Xm a little; if the S value lies in the range of –2° C. to +2° C., the auto amplifier 8 holds the Xm value intact; if the S value is greater than +2° C., the auto amplifier 8 increases the Xm value a little. Then, the auto amplifier 8 stores the Xm value in the memory 9 to update the contents of the memory 9.

Focusing attention on the fact that the Xm value lies in the range of 0 to 1 (0%–100%), various methods are possible as the calculation method of change amount ΔXm of the control parameter Xm. Here, the change amount ΔXm is determined according to a first-order lag at time constant τ as one example.

That is, manipulated variable Xσ is set and the comparison result at step S6 is used. If the S value is less than –2° C., the manipulated variable Xσ is set to 0 (Xσ=0) at step S7; if the S value lies in the range of –2° C. to +2° C., the manipulated variable Xσ is set to the current Xm value (Xσ=Xm) at step S8; if the S value is greater than +2° C., the manipulated variable Xσ is set to 1 (Xσ=1) at step S9. Then, the change amount ΔXm is calculated according to the following expression at step S10:

$$\Delta Xm=(X\sigma-Xm)/\tau$$

When the change amount ΔXm is found, it is added to the current Xm value to correct (change) the control parameter Xm value, namely, Xm=Xm+ΔXm at step S11.

The corrected Xm value at step S11 is stored in the memory 9 at step S12, then is transmitted to the air mix door actuator 4a over the communication line 11 as control data for the air mix door actuator 4a at step S14.

At the termination of step S14, the auto amplifier 8 returns to step S1 and repeats execution of step S1 and the following steps in a predetermined short control cycle, whereby the actuator 4a performs positioning control of the air mix door 3 in response to the corrected command value (target opening) sent in sequence, namely, performs positioning control of the air mix door 3 while changing (correcting) the target opening of the air mix door 3 in the optimum direction in sequence, so that the air mix door 3 is always set to the optimum opening.

The calculation method of the change amount ΔXm in response to the S value is not limited to the above-described method (first-order lag change with 0 or 1 as the final value according to the S value); any proper method may be adopted. For example, a method of adding or subtracting a given value P according to the sign of the S value (Xm=Xm±P), a method of calculating absolute value Q(S) of ΔXm in response to the magnitude of the S value and making an addition or subtraction according to the sign of the S value (Xm=Xm±Q(S)), or the like may be used.

As we have discussed, according to the invention, in the air mix control system wherein the actuator performs specific positioning control of the air mix door on its own, the control parameter transmitted to the actuator (target position) is calculated based on a predetermined intermediate control parameter. Thus, if the intermediate control parameter is made the same as the control parameter in the conventional air mix control system, it can be calculated by the same method as the conventional method and the program change may be minimized. Therefore, the number of development steps is decreased and further the control program reliability is also maintained.

As described in the above, this invention is applied to the air mix door and the controller thereof. However, the embodiments of this invention is not limited to the aforementioned embodiment. For example, this invention can be used to control the intake door, mode doors such as a defrost door, a vent door, and a foot door in the similar manner as described above.

What is claimed is:

1. A door-opening controller for an automobile air conditioner comprising:

a door to be opened;

an actuator for driving said door based on a given target position data; and control means for controlling said actuator;

wherein said control means:

calculates a predetermined intermediate control parameter based on a target temperature in a cabin, said target temperature provided by performing operations on a plurality of input signals, and an initial target position data stored in an internal memory;

corrects the initial target position data in sequence according to the intermediate control parameter value;

stores the corrected target position data in said internal memory to update memory contents; and transmits the corrected target position data to said actuator by two-way serial communication.

2. The door-opening controller for an automobile air conditioner according to claim 1, wherein said actuator inludes:

a motor for driving said door;

position detection means for outputting a current position of said door as a voltage; and a control circuit for controlling a rotation direction of said motor in response to the target position data and output of said position detection means.

3. The door-opening controller for an automobile air conditioner according to claim 1, wherein the plurality of input signals contain a set up temperature from temperature adjustment means provided in an automobile, a cabin temperature, an outside temperature, a solar radiation amount, and a suction temperature.

4. A method for setting a door of an automobile air conditioner, comprising the steps of:

performing operations on a plurality of input signals so as to obtain a target temperature in a cabin;

setting an initial target position data;

calculating an intermediate control parameter based on the target temperature and the initial target position data;

correcting the initial target position data in sequence according to the intermediate control parameter;

storing the corrected target position data; and transmitting the corrected target position data to an actuator for driving the door.

5. A door-opening controller for an automobile air conditioner comprising:

a door to be opened by a controlled amount;

an actuator for controlling the opening of said door based on target position data; and a control unit configured to control said actuator;

wherein said control unit:

calculates an intermediate control parameter based on a target temperature in a cabin, said target temperature calculated based on a plurality of input signals, and an initial target position data stored in an internal memory;

corrects said initial target position data based on said intermediate control parameter to obtain a corrected target position data;

stores said corrected target position data in said internal memory to update said internal memory; and transmits said corrected target position data to said actuator.

* * * * *